Patented Apr. 3, 1951

2,547,671

UNITED STATES PATENT OFFICE 2,547,671

FIRE-RESISTANT ARTICLE, METHOD OF MAKING, AND IMPREGNANT THEREFOR

Morris J. Sostmann and Irwin L. Phillips, Philadelphia, Pa., assignors to Philadelphia Textile Finishers, Inc., Norristown, Pa., a corporation of Delaware No Drawing. Application October 13, 1945, Serial No. 622,234

3 Claims. (Cl. 252—8.1)

This invention relates to the art of rendering materials fire-resistant.

The term "fire-resistant" is used rather than "fire-proof," because it is not possible practically to render a combustible material fire-proof in the true sense of the term. A material to be fire-proof must not propagate flame and must not glow when the source of ignition is removed.

In one of its aspects, the invention concerns itself with compositions for treating combustible materials to decrease their combustibility, or what is the same thing, to increase their fire resistance. The compositions, for want of a better term will be referred to as "fire-proofing compositions" and the active ingredients will be referred to as "fire-proofing ingredients."

In another aspect, the invention concerns itself with methods for making fire-proofing compositions.

In another aspect, the invention concerns itself with methods for treating combustible materials to render them fire-resistant. For convenience of reference, such methods will be termed "fire-proofing methods."

In a further aspect, the invention concerns itself with a product resulting from treating normally combustible materials with the fire-proofing compositions of the invention. Such products will be referred to as "fire-resistant products", the words "fire-resistant" meaning that the product has an increased resistance either to flaming or to glowing or to both types of combustion.

The invention is applicable generally for the treatment of combustible material of animal, vegetable or synthetic origin in various forms, such as textile fabrics of cotton, linen, wool, rayon, nylon, or mixtures thereof, paper in pulp, web, sheet or laminated form, and wood in the form of thin slabs or articles.

The fire-proofing compositions of the invention consist essentially of the reaction products of antimony trioxide with the anhydride of an organic carboxylic acid such as acetic anhydride, the chloroacetic anhydrides, propionic anhydride, butyric anhydride, benzoic anhydride, camphoric anhydride, and naphthalic anhydride or with one or more of said anhydrides. The composition is probably an antimonyl compound, e. g. in the case of acetic anhydride it is very likely antimonyl acetate, $CH_3CO_2SbO$.

The invention will be described with particular reference to the reaction product of antimony oxide with acetic anhydride.

The following is an illustrative method for making the antimony oxide reaction product:

One part by weight of commercial antimony trioxide is refluxed with two parts by weight of acetic anhydride for three hours. Almost all of the antimony oxide dissolves, producing a cloudy tan solution. When cool, the mixture consists of about two-thirds by volume of plate-like crystals and one-third of a clear brown liquid. The mixture may be separated by filtration into a large mass of crystals and a clear bright brown-red liquid. The crystals are apparently antimonyl acetate, and the clear filtrate is apparently a saturated solution of the same compound.

The filtrate may be used to impregnate cloth to render it fire-resistant. It is only necessary to dry the impregnated cloth, but if desired, the cloth may be washed with water until free of acetic acid. The washing with water serves to hydrolyze the antimonyl acetate, an antimony compound being precipitated in situ. If the impregnated cloth is dried without washing out the acetic acid, hydrolysis occurs during use or subsequent laundering. In any event, the resultant cloth has a substantially increased resistance to fire.

The crystals of antimonyl acetate may also be used to treat combustible materials. For this purpose, they may be admixed or dissolved in a non-aqueous solvent. Practically any solvent for acetic anhydride may be used. The preferred solvents are organic carboxylic acids such as, e. g. formic, acetic, halogenated acetic, preferably mono-chloracetic, phenylacetic, and lactic acid. Other suitable solvents are the aromatic hydrocarbons such as benzol, toluol, xylol, coal tar naphthas, and hydrogenated solvent naphthas such as Solvesso.

The material to be rendered fire-resistant is impregnated with the solution, and the solvent then driven off, leaving the antimonyl compound in the interstices. If thought necessary or desirable, the antimonyl compound may be hydrolyzed by washing the impregnated material. In the case of a water-miscible solvent, it is not necessary to drive off the solvent before washing with water.

It is not necessary to separate the crystals from the filtrate before treating combustible materials. The mixture of crystals and brown liquid may be mixed with a solvent for the crystals, and the resulting solution used as a fire-proofing composition. Any of the previously mentioned solvents may be used, but acetic acid is preferred. The impregnated combustible material may be treated in any of the ways previously described.

In the preferred embodiment of the invention, the antimony trioxide and acetic anhydride in the stated proportions are refluxed together until the oxide is completely dissolved. The result is a solution in acetic anhydride of what is apparently antimonyl acetate. This solution may be applied to cloth or other combustible material in exactly the same manner previously described.

Instead of or in addition to acetic anhydride, any of the other anhydrides mentioned may be used either separately or in admixture with one another. At this point, it is to be noted that in the case of solid anhydrides such as chloracetic, benzoic and camphoric, the antimony oxide may be simply mixed with the anhydride in molten form, and the product then dissolved in the solvent. Antimony oxide is readily soluble in the molten anhydrides above mentioned.

The antimony trioxide-anhydride reaction product may be compounded with other fire-proofing materials, such as for instance ammonium compounds, aromatic phosphates, viscous chlorinated hydrocarbons such as chlorinated rubber, chlorinated paraffin, chlorinated naphthalene, etc. Chlorinated paraffins have been found particularly suitable, especially those containing more than about 40% chlorine. The chlorinated paraffins, in addition to being fire-proofing materials themselves, are film formers, and serve to bind the precipitated antimony oxide to the fabric. Other ingredients may also be added, as pigments, extenders, mildew-proofing agents, etc.

The following is given by way of example, the amounts being by weight:

| | Parts |
|---|---|
| Antimony trioxide | 100 |
| Acetic anhydride | 200 |
| Chlorinated paraffin (42%) | 22.5 |
| Chlorinated paraffin (70%) | 27.5 |
| Acetic acid | 800 |

The antimony trioxide and acetic anhydride are refluxed together until a clear solution (brownish-red) is obtained. The solution is mixed with the chlorinated paraffin, and the acetic acid added. The amount of acetic acid brings the concentration of the resultant solids to a point suitable for application to a fabric by impregnation.

The combustible material such as cotton duck is immersed in the acetic acid solution, squeezed as by means of nip-rolls to eliminate excess solution, placed in running water to produce hydrolysis and to get rid of the free acid, and finally dried.

The washing step, as has been previously stated, may be eliminated, in which case the hydrolysis will occur gradually during use of the impregnated cloth, or during laundering.

The final product has its original color, hand, feel, flexibility, and in addition shows excellent resistance to flame, and to char or afterglow. The fire resistance is retained after prolonged exposure to water and weathering. If it is desired to change the color, a suitable dye or pigment may be added to the composition, or the fire-resistant product dyed or pigmented in a suitable manner.

For illustrative purposes, the invention has been described with particular reference to the treatment of textile fabrics such as cotton duck for the purpose of increasing their resistance to fire. It is to be understood, however, that the claims are not to be restricted to this specific application. For, as has been indicated, the invention is applicable to the treatment of combustible materials generally. Furthermore, the invention is not to be restricted to the anhydride and acid solvent specified in the example, since the other anhydrides, and solvents mentioned in the disclosure may be used with substantially the same results. Moreover, the fire-proofing treatment of the invention may be combined with various other treatments, e. g. waterproofing and/or mildew-proofing. The additional treatments may be combined in one operation with the fire-proofing, or applied in preliminary or subsequent operations. As an example, it may be stated that fibrous material impregnated with antimonyl acetate or with hydrolyzed antimonyl acetate may be coated with a film of chlorinated hydrocarbon such as chlorinated rubber or paraffin, synthetic resins such as vinyl acetate, co-polymerized vinyl chloride and vinyl acetate, melamine resins, chlorinated polystyrene, etc.

We claim:

1. A composition for rendering combustible materials fire-resistant, said composition being the product obtained by refluxing one part by weight of antimony trioxide with two parts by weight of acetic anhydride until the oxide is completely dissolved.

2. A method of rendering combustible material fire-resistant, which consists in impregnating said material with the composition defined in claim 1.

3. A fire-resistant material consisting of a normally combustible base impregnated with the composition defined in claim 1.

MORRIS J. SOSTMANN.
IRWIN L. PHILLIPS.

REFERENCES CITED

The following references are of record in the file of this patent:

UNITED STATES PATENTS

| Number | Name | Date |
|---|---|---|
| 1,451,313 | Arent | Apr. 10, 1923 |
| 1,867,658 | Dreyfus | July 19, 1932 |
| 2,281,784 | Mohr | May 5, 1942 |
| 2,299,612 | Clayton et al. | Oct. 20, 1942 |

FOREIGN PATENTS

| Number | Country | Date |
|---|---|---|
| 8,509 | Great Britain | 1902 |
| 222,621 | Germany | May 31, 1910 |
| 846,522 | France | June 12, 1939 |

OTHER REFERENCES

Christiansen: Organic Derivatives of Antimony, publ. by the Chemical Catalog Co. of N. Y., 1925, pp. 74–80, 198 and 199.

The Fireproofing of Textiles, by Textile Research Institution, (1943), page 6.